W. T. GLENN.
MOUNTING FOR SLASHER SAWS.
APPLICATION FILED JAN. 7, 1919.
1,311,387.
Patented July 29, 1919.
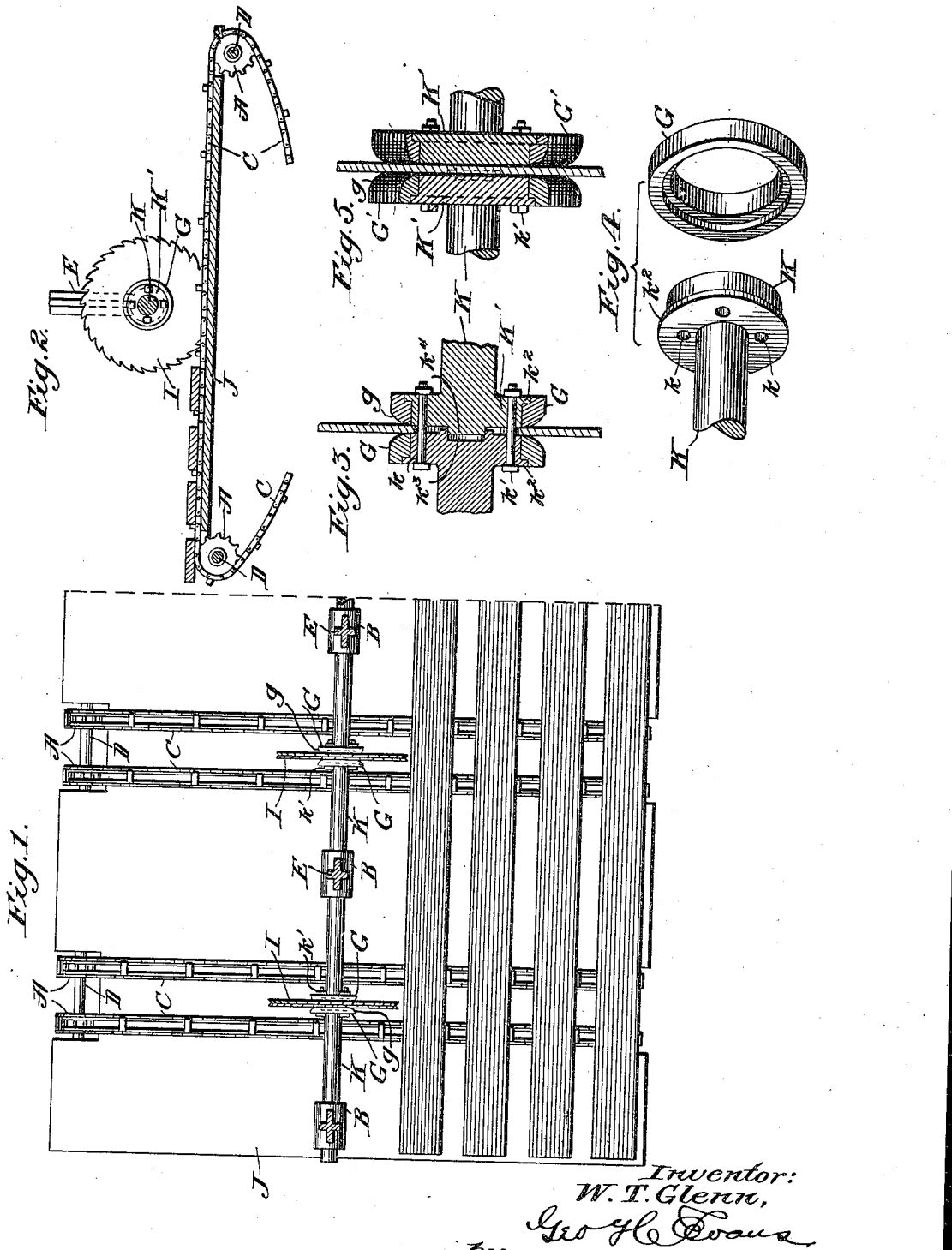
Inventor:
W. T. Glenn,
by Geo. H. Evans
Att'y.

United States Patent Office.

WALTER T. GLENN, OF PINE BLUFF, ARKANSAS, ASSIGNOR OF ONE-HALF TO CHARLES H. MURPHY, OF PINE BLUFF, ARKANSAS.

MOUNTING FOR SLASHER-SAWS.

1,311,387.     Specification of Letters Patent.     Patented July 29, 1919.

Application filed January 7, 1919. Serial No. 269,999.

*To all whom it may concern:*

Be it known that I, WALTER T. GLENN, a citizen of the United States, residing at Pine Bluff, in the county of Jefferson and State of Arkansas, have invented certain new and useful Improvements in Mountings for Slasher-Saws, of which the following is a specification.

My invention relates to a mounting for slasher saws.

The objects of the invention are, first, to provide the collars, between which the saw is clamped, with outwardly beveled edges next to the saws to allow the saws to bend laterally over beveled edges, instead of over straight edges and so prevent breaking of the saws at the eye, as is now commonly the case. Secondly, to provide removable and interchangeable bevel edged collars of different diameters, the larger collars serving to clamp saws having breaks at the eyes and so rendering them capable of re-use.

These objects I accomplish by the construction shown in the accompanying drawing, in which:

Figure 1 is a plan of a slasher sawing machine.

Fig. 2 is a sectional side elevation.

Fig. 3 is a longitudinal section through a pair of the clamping collars with a saw clamped in place.

Fig. 4 is a perspective of the mounting separated, and

Fig. 5 shows a pair of the larger collars secured in place on the hubs in lieu of the smaller collars of Figs. 3 and 4.

A, A designate sprocket wheels mounted on parallel front and rear shafts D, D, and over these sprockets pass the endless conveyer chains C, C, having fingers or projections to carry the slabs or lumber toward the slasher saws I. The upper horizontal runs of the conveyer chains C, C travel over a horizontal table or supporting floor J.

E, E are shaft hangers depending from any overhead support, not shown, and provided at their lower ends with journal boxes B, in which the saw shaft K is journaled. The saw shaft K is in several longitudinal sections provided at their abutting ends with hubs K' having transverse bolt holes $k$, $k$ through which the clamping bolts $k'$, $k'$ are passed for clamping the hubs and the saws I together. These hubs K' are provided with annular shoulders $k^2$ around their outer edges and upon the shouldered hubs K', $k^2$ are placed the internally shouldered collars or rings G, G, the adjacent faces of the rings being beveled outwardly, as shown, at $g$ $g$, so that the beveled surfaces $g$, $g$ lie next to the opposite sides of the saws I, I. The abutting ends of the sections of shaft K are provided, concentric with the hubs K', with a socket $k^3$ and tenon $k^4$ respectively to assist in holding the shaft sections in proper alinement.

The rings or collars G', G' in Fig. 5 are considerably larger than the collars G, and are interchangeable therewith.

The rings or collars G, G are employed with new saws or saws having unbroken eyes, while the larger heavier rings or collars G' are employed with saws which are broken in the eye, and I find that by the use of these larger beveled collars G' saws which were cast aside as useless may be used with perfect safety and with good working results.

By beveling the collar edges next to the sides of the saws the saws are allowed to bend laterally over a curved or inclined surface instead of over a rectangular edge as in the commonly used form of clamping collar, which latter angular edge causes the saw to break at the eye and so become useless. The advantages of my beveled collars have been proven in practice both as to new saws and saws broken at the eye. The rough work done by slasher saws necessitates a free lateral bend at the collar edge not desired in types of circular saws employed in finer work.

What I claim is:

2. A mounting for slasher saws comprising clamping collars to engage opposite sides of the saws; said collars being beveled outwardly on their adjacent faces to allow the saw to bend laterally over the bevels without breaking at the eye.

2. A mounting for slasher saws comprising clamping collars formed of inner hubs and outer removable collars or rings beveled outwardly on their adjacent saw-engaging faces to allow the saws to bend laterally over the bevels without breaking at the eye.

3. A mounting for slasher saws comprising hubs and interchangeable collars of different diameters mounted thereon; the smaller collars for unbroken saws and the larger collars for saws broken at the eye;

the adjacent faces of the collars being beveled outwardly to allow the saws to bend laterally over said bevels as described.

4. A mounting for slasher saws comprising shaft sections provided at their abutting ends with transversely-apertured hub members formed with external shoulders, and removable saw-engaging rings or collars having internal shoulders engaging the hub shoulders and held thereby from movement in a direction away from the saw; the adjacent faces of the removable rings or collars being beveled outwardly to permit the saw to bend laterally over the bevels without breaking at the eye.

5. In a slasher saw mounting, a shaft section having an externally shouldered hub and an internally shouldered clamping ring mounted removably on the said hub and beveled outwardly on its saw-engaging face for the purpose described.

In testimony whereof I affix my signature.

WALTER T. GLENN.

Copies of this patent may be obtained for five cents each, by addressing the "Commissioner of Patents, Washington, D. C."